United States Patent [19]

Newkirk et al.

[11] Patent Number: 4,517,412

[45] Date of Patent: * May 14, 1985

[54] CARD-ACTUATED TELECOMMUNICATION NETWORK

[76] Inventors: Martha Newkirk; Larry Newkirk, both of 8 Park La., Madison, N.J. 07940

[*] Notice: The portion of the term of this patent subsequent to Mar. 27, 2001 has been disclaimed.

[21] Appl. No.: 554,726

[22] Filed: Nov. 23, 1983

Related U.S. Application Data

[63] Continuation-in-part of Ser. No. 356,430, Mar. 9, 1982, Pat. No. 4,439,636.

[51] Int. Cl.³ .......................................... H04M 17/02
[52] U.S. Cl. ........................... 179/7.1 R; 179/6.3 CC; 179/2 CA; 179/2 A; 179/18 B
[58] Field of Search ............ 179/7.1 R, 6.3 CC, 2 CH, 179/2 A, 18 B, 2 CA, 2 DP, 7 R, 8 R, 18 D, 18 DA, 90 CS, 6.3, 6.4; 235/380; 340/825.33, 825.26

[56] References Cited

U.S. PATENT DOCUMENTS

| | | | |
|---|---|---|---|
| 2,298,487 | 10/1942 | Kiner | 179/2 |
| 2,615,972 | 10/1952 | Hubbard | 340/825.33 |
| 3,022,381 | 2/1962 | Pferd | 179/6.4 |
| 3,087,018 | 4/1963 | Pferd | 179/6.4 |
| 3,169,168 | 2/1965 | Capranica | 179/6.3 |
| 3,571,799 | 3/1971 | Coker et al. | 340/152 |
| 3,594,727 | 7/1971 | Braun | 340/825.26 |
| 3,665,397 | 5/1972 | Di Napoli et al. | 340/825.3 |
| 3,702,392 | 11/1972 | St. Jean | 235/61.7 B |
| 3,723,655 | 3/1973 | Zucker et al. | 179/2 DP |
| 3,728,522 | 4/1973 | Norwich | 235/380 |
| 3,752,904 | 8/1973 | Waterbury | 178/5.1 |
| 3,784,793 | 1/1974 | Ito et al. | 235/61.11 D |
| 3,787,623 | 1/1974 | Stephenson | 179/2 DP |
| 3,929,278 | 12/1975 | Balavoine et al. | 235/61.8 R |
| 3,937,925 | 2/1976 | Boothroyd | 235/380 |
| 3,959,607 | 5/1976 | Vargo | 179/183 |
| 3,982,103 | 9/1976 | Goldman | 235/380 |
| 4,023,014 | 5/1977 | Goldberg | 235/380 |
| 4,048,475 | 9/1977 | Yoshida | 235/380 |
| 4,068,213 | 1/1978 | Nakamura et al. | 340/823.33 |
| 4,197,986 | 4/1980 | Nagota | 235/379 |
| 4,326,123 | 4/1982 | Hosterman | 235/380 |

*Primary Examiner*—Stafford D. Schreyer
*Attorney, Agent, or Firm*—Michael Ebert

[57] ABSTRACT

A public access network operating in conjunction with existing telecommunication lines to permit a caller holding a machine-readable credit card to make calls from any local station included in the network without having to deposit coins and without human intervention. The network is constituted by a master control central linked to a group of satellites installed at different locations, such as airport terminals. At every installation, the satellite acts as a hub for many local telephone stations each provided with a standard telephone set and a card reader adapted to scan the caller's credit card to derive therefrom a digital signal identifying the card, its number and expiration date. This signal from an originating local station is transmitted through the associated satellite to a verification processor at the central to test the card number against a stored table of invalid numbers and in other respects to determine the acceptability of the card. If the card passes this test the originating local station is so advised and the telephone set is then activated to permit the caller to dial.

7 Claims, 4 Drawing Figures

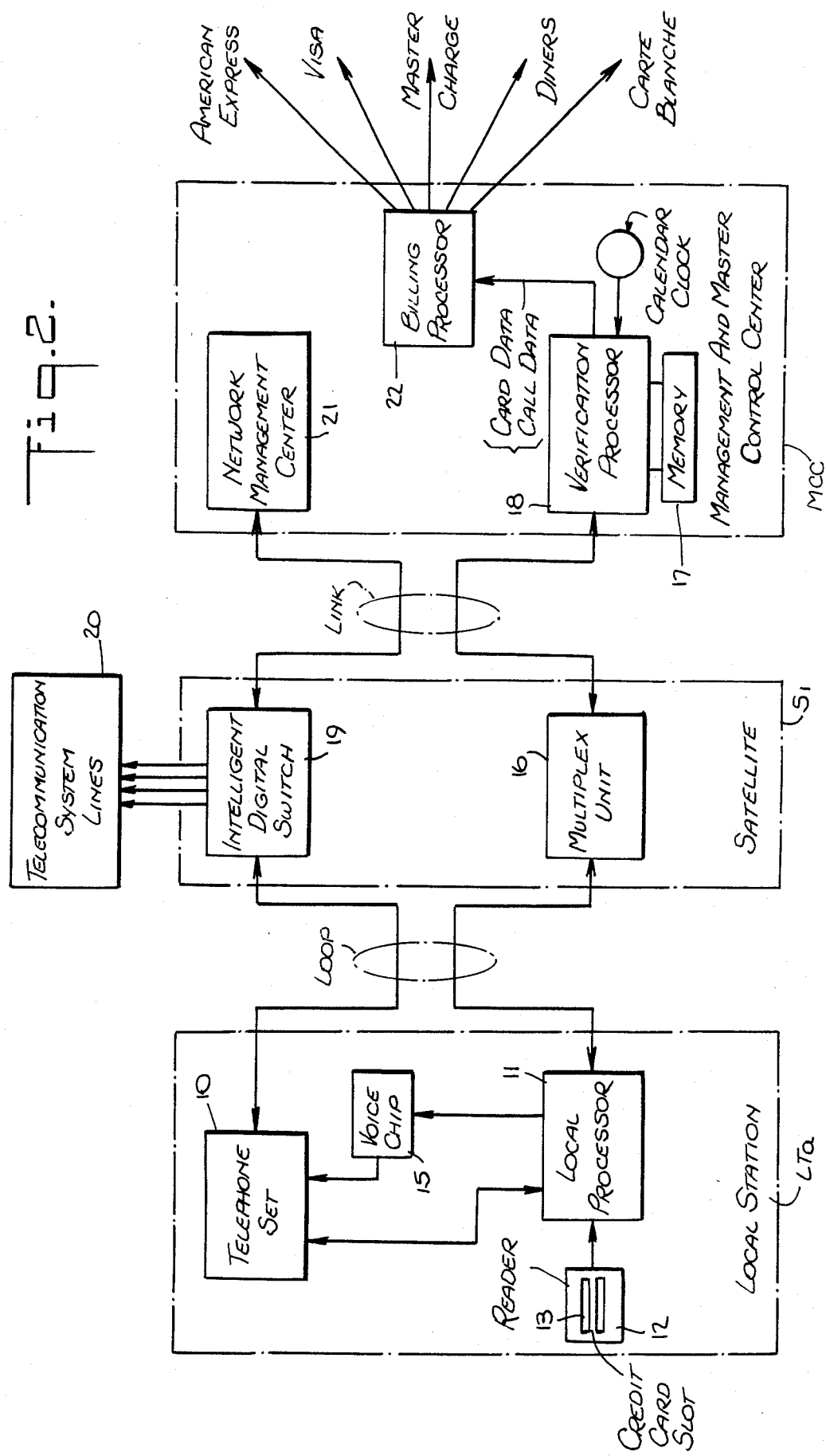

CARD-ACTUATED TELECOMMUNICATION NETWORK

RELATED APPLICATION

This application is a continuation-in-part of our co-pending application Ser. No. 356,430, filed Mar. 9, 1982, now U.S. Pat. No. 4,439,636, the entire disclosure of which is incorporated herein by reference.

BACKGROUND OF INVENTION

This invention relates generally to telecommunications, and in particular to a public network operating in conjunction with existing telecommunication lines, making it possible for callers to purchase billable communication services by means of machine-readable credit cards.

While the invention will be described mainly in connection with voice communication, it is to be understood that it is also capable of transmitting over existing telecommunication lines, facsimile images, computer data and any other form of intelligence conveyable over such lines.

A telephone system serving a multitude of parties has to take into account many factors and is therefore inherently complex. The system must be capable of rapidly setting up an exclusive channel between the calling party and any one of a large number of others located at remote points, and a ringing signal alerting the party being called. When a connection is established, the system must insure effective two-way private communication. Economics also come into play, for all of these actions must be realizable at affordable prices. Additionally, for this system to be viable for public use, it must be conveniently billable on a single call basis and it must afford universal access to call any party having a telephone facility.

In its most elementary form, a modern telephone system is composed of several central offices at different sites which are interconnected by trunk lines, each central office serving a large number of local telephone sets coupled to the office by loop circuits. At the central office, various switching functions are carried out automatically. Thus when the caller raises his set, and in doing so actuates a switch, his calling line must be identified and a connection made thereto. A switching mechanism at the central office then acts to pick out an available transmission path to the called party who may be connected to the same switchboard or to some distant switchboard reached over one or more trunk lines.

The central office must also determine whether the called line is already in use and be able to signal the called station. When the parties at both ends terminate their conversation and hang up their sets, all circuits must then be restored to a state in readiness for other calls. It is also necessary to billing purposes to record the location and duration of the call.

Such central offices are established by local operating telephone companies to service a multitude of residences or business phones. Alternatively, a single business, a building complex or an otherwise defined area of high volume usage may supply its own central office function, i.e., switching equipment to service its user's calls and to link them to local operating company or other transmission lines. Thus a multitude of private telecommunication switching systems using private branch exchange (PBX) or other switching devices, have been installed in recent years to service businesses of all sizes.

A properly designed telephone system must have sufficient trunk capacity between switching points to meet the demand for services during busy periods and thereby avoid excessive delays in making a connection. Modern automatic switching mechanisms such as those used to provide the central office function to high volume business area also provide for alternate routing to select the least expensive route and to circumvent the failure of a link in the preferred routing of a call, or when the facilities are temporarily overloaded. Because the system lacked the ability to bill individual calls to any person without prior commitment, these switching mechanisms have not heretofore been useable to carry out the central office function in a truly public application. However, such switching mechanisms are widely used to reduce telecommunication costs for businesses.

In order to introduce competition into the telephone services market, the Federal Communications Commission (FCC) recently authorized the reselling of bulk telecommunication services. Thus it is now possible for a private operator to purchase WATS or other bulk rate services from the Bell System and make them available to the public at rates below those that would have to be paid by users making calls directly through the Bell System.

WATS, or wide area telephone service, allows a customer to call anyone in one or more of the several bands into which the continental U.S. has been divided on a direct dialing basis for a flat monthly charge related to the number of areas to be called.

These FCC rulings have been construed to authorize resellers to provide telephone service to the public using switching devices as described above, which service heretofore was offered only by proprietors of telecommunication network facilities. The present invention now renders technically feasible and realizable that which the FCC has stamped as legally permissible.

The present invention is a solution to many practical problems encountered when making calls in public telephone booths of the conventional type. To illustrate a typical situation, we shall assume that a Mrs. Smith is scheduled to fly from New York to Chicago to visit her son, and that she has just been advised at the airport terminal that the departure of her flight has been delayed for two hours.

Since Mrs. Smith will not be able to meet her son in Chicago at the expected time, she goes to a public pay phone at the airport terminal and deposits a dime in the coin receiver. This gives her a dial tone. She then dials her son's Chicago telephone number, at which point her dime is returned and she hears the operator who instructs her to deposit two dollars and fifty cents in coins (or some such amount) for the first three minutes.

The fact that Mrs. Smith then finds that she lacks sufficient coins for this purpose should surprise no one, for this is a commonly experienced inconvenience. When Mrs. Smith finally succeeds in changing some bills to obtain the necessary coins, she must redial the number; but even then she may face a new problem. Should Mrs. Smith's call run overtime and the operator demands additional coins, she may not have them in her possession and be cut off.

We shall now replace Mrs. Smith by her husband, Mr. Smith, a businessman who is a frequent traveler and carries a Bell Telephone credit card. This card assigns Mr. Smith a 14 digit number made up of his area code and business phone number (totally 10 digits) plus 4 additional code digits. Mr. Smith need not in the same situation concern himself with a dearth of coins beyond the dime necessary to reach the operator. All he need then do is to read off to the operator his 14 digit number.

Only a relatively limited number of subscribers are in the possession of telephone company credit cards which relieve the holders of the need to deposit coins in public telephones. However, such cards are not free of practical drawbacks, for they prolong the time necessary to make a call. The caller, in addition to having to dial or key in the number of the party being called, must also supply the 14 digit credit card number.

Moreover, there is the risk that one who overhears or is otherwise informed of the 14 digit number may make unauthorized and costly long distance calls that will be billed to the card holder. The security inherent in ordinary commercial credit cards which carry a signature that can be checked and which must be presented to the seller to complete a transaction, is absent in telephone credit cards; for all one need do to make a credit call is to know the card number.

It is estimated that the five major credit card companies (Master Card, Visa, American Express, Diners and Carte Blanche) have in circulation more than 70 million credit cards. Nevertheless, the familiar statement that such cards render cash transactions obsolete is not entirely true. Though a card holder can use his card to pay for travel, lodging, food, entertainment, clothing and virtually anything else that is purchaseable, excluded from this extraordinary convenience is the ubiquitous public pay phone. Yet the public phone performs a vital function; for when away from home or office, we are all put in the position of having to use such phones to make calls.

The term "major credit cards" as used herein refers to credit cards which are nationally recognized and honored, as distinguished from those special credit cards issued by department stores and similar organizations and which are honored only by these organizations.

The term "machine-readable credit card," as used herein, is meant any card which contains identifying indicia in any form that can be magnetically, optically or otherwise scanned to generate digital signals representative of this data. Thus the existing major cards contain a magnetic stripe which when scanned yields signals identifying the nature of the card as well as the card holder's number and expiration date. However, the invention is also applicable to machine readable cards of the character-recognition type or which have magnetically embedded indicia or so-called "smart" cards which incorporate microcircuits.

SUMMARY OF INVENTION

In view of the foregoing, the main object of this invention is to provide a public access network which operates in conjunction with all existing and commonly available transmission lines, the network making it possible for a caller holding a major credit card to make universal calls from any local telephone station included in the network without the need to deposit coins and without human intervention.

While the invention is especially valuable in making long distance calls from a local telephone station, the rising cost of local phone service now justifies the use of credit cards for this purpose. The term universal therefore covers calls made to any point near or remote without any restriction.

More particularly, an object of this invention is to provide a network of the above type in which local telephone stations may be installed at public facilities, the local stations at each facility being linked to a facility satellite, and in which the satellites at the various facilities are linked to a remote management and master control central which acts to supervise the operation of all satellites and to generate credit card billing information for the long distance calls made from all local stations in the network.

By public facilities is meant not only airports, for this term encompasses convention centers, shopping centers, hospitals, hotels or any other place of the type which now has a pay telephone.

A significant advantage of a network in accordance with the invention is that a universal call can be made in significantly less time than it now takes to make a call in a pay phone or by means of a telephone credit card, which requires that its number be dialed or conveyed to an operator before a call can be placed.

Yet another object of the invention is to provide a public access network largely made up of known components that are mass-produced and commercially available so that the overall cost of the network, despite the unique functions it performs, is relatively modest.

Briefly stated, these objects are attained in a public access network operation in conjunction with existing telecommunication lines to permit a caller holding a machine-readable credit card to make universal calls from any local stations included in the network without having to deposit coins and without human intervention. The network is constituted by a master control central linked to a group of satellites installed at different locations, such as airport terminals.

At every installation, the satellite functions to service a plurality of local telephone stations each provided with a standard telephone set, a card reader adapted to scan the caller's credit card to derive therefrom a digital signal identifying the card, its number and expiration date. This signal from an originating station is transferred through the associated satellite to a verification processor at the central. This verification processor acts to test the card number against a stored table of invalid numbers and to determine whether the card in all other respects is acceptable to the network.

If the card passes this test the originating local station is so advised and the telephone set is activated thereby to permit the caller to dial. An intelligent switch at the satellite receives the number dialed from the activated telephone set and connects this set to an appropriate transmission line to put the call through. Central functions not only to verify the credit cards and to manage the operation of the intelligent switches, but also to extract from the details of calls made from the local stations and the related credit card data the necessary information required to generate a billing record for submission to the various credit card companies.

OUTLINE OF DRAWINGS

For a better understanding of the invention as well as other objects and further features thereof, reference is made to the following detailed description to be read in conjunction with the accompanying drawings, wherein:

FIG. 2 illustrates in greater detail the components which make up the management of central control, one of the satellites and one of the local telephone stations included in the network;

DESCRIPTION OF INVENTION

The Public-Access Network

Figure 1:
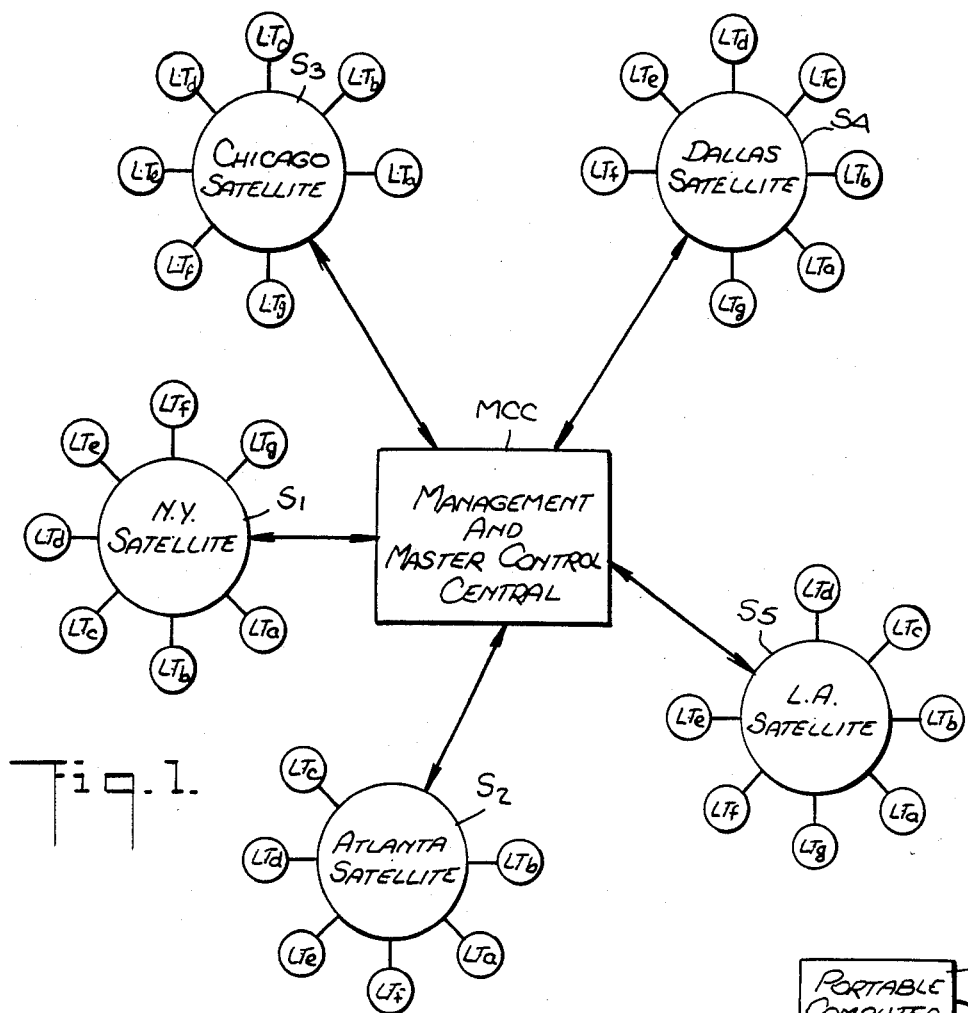
FIG. 1 is a block diagram of a public access network accordance with the invention.

Referring now to FIG. 1, there is shown a public access network in accordance with the invention operating in conjunction with existing telecommunication lines. By existing lines is meant the national telecommunication network established by AT&T, its operating companies, the various independent telephone companies and specialized common carriers, that is to say all telecommunication lines capable of being tied into an access network in accordance with the invention.

To illustrate the network in a simplified version, we shall assume installations at five high traffic locations, these being airport terminals at New York, Atlanta, Chicago, Dallas, and Los Angeles; the locations, therefore, being dispersed throughout the continental United States. At each of these airports there is installed a satellite S; hence in the example shown we have satellite $S_1$ in New York, satellite $S_2$ in Atlanta, $S_3$ in Chicago, $S_4$ in Dallas and $S_5$ in Los Angeles.

Linked to each satellite is a plurality of local public telephone stations $LT_a$, $LT_b$, $LT_c$, etc. these being placed at convenient points throughout the airport terminal. The several satellites are all linked to a management and master control central MCC which can be located anywhere, such as Ohio. The links between the control central and the satellites may be by dedicated data lines, dial-up lines, private lines or by wireless communication. And the links between the local stations and the satellite may be dedicated wired links, a microwave wireless link or any other linkage means.

When a caller holding a credit card accepted by the network is at any one of the airports serviced by the network and he wishes to make a call, he goes to the nearest available public telephone station LT. This station will be marked to distinguish it from conventional pay phone booths. Thus the station sign may read "Credit Card Phone" to indicate that it is useable by any one holding a major credit card, a card issued by a Bell Telephone Company or any other card which is chosen to be acceptable to the network.

Each station is equipped with a standard telephone set which may be wall or desk mounted, the set including a dial or alpha-numeric keyboard, but no coin receiver. Also at the station is a credit card reader slot to accommodate the caller's card. Assuming that the reader is designed to read cards bearing magnetic stripes, it may be of the type which requires the user to slide the card through the slot to effect magnetic scanning, or of the type in which a stationary card inserted in the slot is scanned by a traversing head. In either case, the digital signal yielded by the reader provides digital data identifying the nature of the card (i.e., American Express, Visa, Bell Telephone, etc.), the holder's number and also the expiration date of the card, if such is included on the card.

This digital signal from the originating local station is sent to the related satellite where it is transferred by a multiplexer to a verification processor at control central MCC where it is tested against a stored listing or table of invalid numbers. Currently, of the approximately 70 million cards issued by Master Card, American Express and other national credit card organizations, about 6 million are posted as invalid, either because the card has expired, has been cancelled for non-payment or is stolen. The verification processor first checks to see whether the credit card is issued by a credit institution acceptable to the network and also whether the card is unexpired.

Rather than store a listing of all invalid numbers at control central MCC, one may provide a data link directly to each credit card company which maintains a "bad card" listing, kept current on a dynamic basis. A positive verification or a look-up in a listing of all issued and current credit cards may not be as satisfactory, not only because of the length of time it takes to make such an inquiry, but also because it is somewhat costly. However, regardless of the card verification arrangement, the control central MCC is in control thereof, whether the inquiry is handled in house, as it were, or by a link to another system. Alternatively, this verification procedure may be carried out at the satellite as in our co-pending application.

If a caller's card passes the verification test at the control central, the local processor at the originating local station is advised of this fact and it then activates the telephone set which gives the caller a dial tone permitting him to dial his number. At the satellite an intelligent digital switch connects the caller's telephone set at the local station linked thereto to the appropriate line of the telecommunication system to which the satellite is coupled. A considerable savings may be realized by making use of WATS and private lines or foreign exchanges in conjunction with the intelligent switching units which are adapted to choose the optimum or least expensive line for the call being made.

The duration of the calls, the identity of the called station and all other pertinent details are entered by the local processor at the originating station and this call data is sent to the satellite where it is transferred to the management and master control central MCC where the call data and the card data are recorded to provide billing records. The billing records containing the appropriate charges for the calls made by the card-holding callers are preferably recorded on magnetic tape, from which the necessary records are compiled and sorted for distribution to the various credit card companies. This will be generated in a manner compatible with established billing cycles at these companies, so that the itemized monthly statements issued by the credit card companies will include the charges for calls made by the card holders.

The Structure of the Network Components

Referring now to FIG. 2, there is shown in block form the basic elements which make up the management and master control center MCC common to all satellites in the network, one of these satellites ($S_1$) linked to this center, and local stations $LT_a$ one of many local stations serviced by this satellite.

Local station $LT_a$ is provided with a standard telephone set 10 activated by a local processor 11 which receives digital signals derived from a credit card reader 12 having a slot 13 adapted to receive a caller's credit card. The card scanned thereby causes the reader to yield a digital signal identifying the company issuing the card (AE, Visa, etc), its card holder number and its expiration date.

Local processor 11 controls a voice chip 15 coupled to telephone set 10 which interacts with the caller during the card verification process carried out at management and master control central, as will later be explained. Voice chip has synthetic voice messages stored therein which are selected by the local processor. Thus after the caller inserts his credit card in reader 12, the caller is first advised by a computer-generated message that his card is now being verified.

In lieu of computer-generated voice messages use may be made of LCD and other displays to provide printed messages. In practice, other means may be used to give the caller messages without the need for a human operator.

The card data digital signal received in local processor 11 is transmitted to multiplexing communication unit 16 at satellite $S_1$.

The unit acts cyclically to successively scan the local processors in the several local stations LT linked to satellite $S_1$, to extract the credit card digital signal therefrom and to transfer this signal to a verification processor 18 at master control central MCC. Unit 16 also works in reverse, that is to say, it received from verification processor 18 a signal indicating whether a credit card that had been processed therein is valid or invalid and transfers this validation signal to the originating local station. Thus the satellite acts as a hub with respect to the local stations linked thereto.

Verification processor 18 at control central MCC checks the card number with logic routines identifying the credit card company which are stored in memory 17 and it checks the expiration date on the card against a calendar clock. It then checks the calling card number against a table of invalid numbers stored in memory 17 or stored in another computer to which the processor is linked. This "negative" table file or data base is developed on information received from the credit card companies cooperating with the network operator, the control center updating this information frequently in the verification processor. Or the data base may be positive; that is, a file limited to valid numbers. In practice, one may simplify the system by limiting validation to the identity of the credit card company and the expiration date, and run the risk with respect to the validity of the cardholder's number. In some circumstances, such as a disaster prohibiting access to the negative file, calls could be allowed without any verification, at the risk of some calls being made using invalid cards.

If verification processor 16 finds the calling card to be invalid, this rejection is conveyed back through multiplexer 16 to the local processor 11 at the local station which again activates chip 15 to tell the caller that his card is not valid. If, however, verification processor 16 at the control central finds the calling credit card valid, the local processor 11 linked thereto is advised of this fact and it activates telephone set 10 which then generates a dial tone permitting the caller to dial his number.

While we have shown a verification processor 18 located at control central MCC to service all satellites included in the network, in practice each satellite may have its own verification processor to verify cards in connection with all local stations linked to that satellite.

The activated telephone set is coupled to intelligent digital switch 19 which in turn is coupled to the telecommunication lines 20, this switch then connecting telephone set 10 to the appropriate line for the telephone number dialed by the caller. The selection of the appropriate line by switch 19 is under the supervision of the network management center 21 at central MCC which manages route optimization decisions for the intelligent switches in all of the satellites either centrally or by providing tables for each.

In order to provide billing information, a billing processor 22 at control central MCC has access to the log created by the verification processor 18. In addition to the credit card number, this processor places information in the log from the local processors which provide data as to the duration of each call, the destination of the call, and where the call is made. A proper charge can be made for each call, this information presenting an input to billing processor 22, from which billing records can be generated for each credit card company pursuant to the required specifications of the company.

Magnetic tapes of billable charges can then be compiled and sorted for distribution to the credit card companies.

Telecommunication Alternatives

Rather than use an intelligent switch 19 at each satellite included in the network to connect the caller's telephone set at the local station linked thereto to the appropriate line of the telecommunication system to which the satellite is coupled, the equivalent of one direct line for each local station can be provided into the central office of the carrier supplying the telecommunication lines. This alternative arrangement will afford an operation tantamount to that of intelligent switches with respect to those common carriers and operating companies that offer least-cost route selection via their own switching equipment per the instructions of the purchaser of such services.

It is not essential in a network in accordance with the invention that it be operated by a reseller of bulk rate services, for an owner of telecommunication lines or a common carrier could install and operate a credit-card actuated communication network which affords the same benefits to the general public. From a user's point of view, it makes no difference who operates the network, except possibly that services obtained through a reseller may be discounted.

Figure 3:
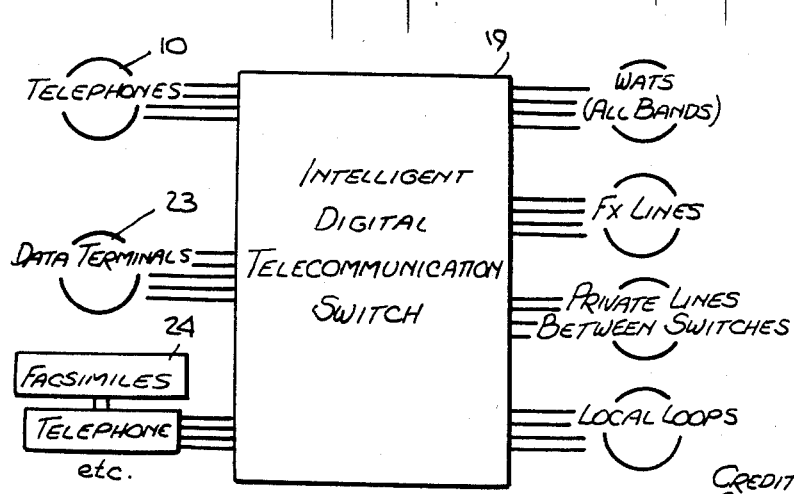
FIG. 3 illustrates the manner in which the intelligent digital switch acts to provide a broad range of telecommunication services.

As shown in FIG. 3, with respect to one of the intelligent switches 19 included in the network, each of these switches is selectively connectable to a range of telecommunication lines; i.e., WATS (all bands), FX lines, private lines between switches and local loop.

And while in the network previously disclosed, each intelligent switch 19 at a given satellite is connected to the telephone sets 10 at the local station linked to the satellite, in practice, the switch may be linked to other local communication terminals such as computer data terminals 23 or facsimile-telephone terminals 24, all of which produce data transmittable over telecommunication lines.

Components

In a network in accordance with the invention made up of a management and control central MCC, a group of satellites S linked to central, and a plurality of local stations LT looped to each satellite, the only components in the network which fall into the class of telephone equipment are the telephone sets 10 and the intelligent digital switches 19. The telephone sets are of standard design and are available from many commercial sources. The switches are also commercially available. Thus, among the commercially-available digital intelligent switches which are usable are Northern Telecom SL-1, Rockwell-Galaxy or Westcom 580 and Harris D-1200. Also usable for this purpose are commercially-available digital PBX's.

Other components are in the form of digital processors or mini-computers which are adapted or programmed to carry out the functions assigned to them by the network. Thus the local processor 11 is a processor adapted to link the card reader and the telephone set and to coordinate their interaction with the user. The local processor also controls the voice chip or other form of response to the user. The management center 21, on the other hand, is capable of polling statistical and diagnostic information from each of the switches, while the billing processor 22 must calculate the charges to be imposed on the calls. Thus all of the processors must be capable of carrying out logic or arithmetic function.

A digital computer is capable of carrying out arithmetic or logic operations on data entered therein and of yielding numerical results or decisions. Whether in the form of large-scale, general-purpose computer, a minicomputer or a microcomputer, all digital computers are essentially composed of a central processing unit, a memory system and some form of an input-output device.

The task assigned to a central processing unit is to receive and to store for later processing in a memory data in the form of binary digits or bits, to perform arithmetic or logic operations on this data in accordance with previously-stored instructions, and to deliver the results in terms of digital signals or through a read-out device such as a printer.

The central processing unit (CPU) is that component of the computer which controls the interpretation and execution of instructions. In general, a CPU contains the following elements: "Control" which includes control logic and instructions for decoding and executing the program stored in "Memory;" "Registers" which provide control with temporary storage for bits, bytes or words; and Arithmetic and Logic Unit that performs arithmetic and logic operations under the Supervision of Control; and Input-Output ports providing access to peripheral devices such as a keyboard.

The memory system is that component of the computer which holds data and instruction codes, each instruction or datum being assigned a unique address that is used by the CPU when fetching or storing the information. The read-only memory or ROM is a memory adapted to store information permanently, such as a match function or a micro-program (a special purpose program initiated by a single instruction in the system's main program.) A memory that can be programmed by the user, but only once, is known as a programmable ROM or PROM; hence when a PROM is programmed, it then functions as a ROM.

The capability of a computer depends in good part on the storage capacity of its memory system. The amount of information stored ranges from fewer than 100 bits, as in simple pocket calculators, to more than a billion bits for a large-scale computer. Integrated-circuit memories based on transistors are designed to store bits of binary digits on a chip.

The basic "hardware" components of a digital computer are the central processing unit (CPU), the memory system and input-output devices. The registers, the control and the arithmetic logic unit of the CPU are linked with the memory system and the input-output device by a data bus; that is, a group of wires that allows the memory, the CPU and the input-output device to exchange signal bits, bytes or words. Where time is a factor, as in local processor 11, associated therewith is a real time clock. In practice, the computer's power supply may have a battery pack back-up so that the power remains uninterrupted should the supply fail. Computer memories may include a local lithium battery so that the memory is non-volatile and will continue to store data in the event of a power failure.

The voice chip may be any commercially-available microelectronic device in which the messages are stored therein in digital form and when read out are converted into audio signals by a digital-to-analog converter. Thus most components which in combination make up the system are commercially-available; hence the overall cost of the system is relatively modest.

With respect to the use of the access network for forms of communication other than voice, instead of local telephone stations linked to the satellite at say an airport, the airport may have a communication center tied in with the satellite, at which center there are facsimile and other data terminals which are credit card-operated in the manner of the invention.

Data Terminal

There is growing interest in using telephone lines intended for voice transmission to also transmit computer data, thereby merging computer and communications technology. Thus a salesman operating in the field for a corporation that is equipped at its home office with a main frame computer, may make use of a briefcase or portable computer to enter his orders, to make estimates and to make of record various field transactions. This portable computer can then be linked by a suitable telephone modem with the home office computer. Portable processors of this type are currently available from Texas Instruments, Toshiba and other manufacturers of home computers.

Recently introduced by Tandy Corp. is a book-sized computer TRS-80 Model 100 which is programmed to carry out many chores. This unit can be plugged directly into a standard telehome jack so that by means of this unit an executive at home or on vacation can tap into his corporate computer or call up a remote data base.

And while with some commercially-available portable computers one can plug into a telephone jack at home or at the office, it has not heretofore been possible to plug into a public pay phone, say at an airport terminal. And even if a public pay phone included a jack reserved for data transmissions, there would be the vexing problem of finding coins in the amount required for a given call, to say nothing of the problem of being notified that the caller has run out of time and more coins are necessary to continue data transmission.

Figure 4:
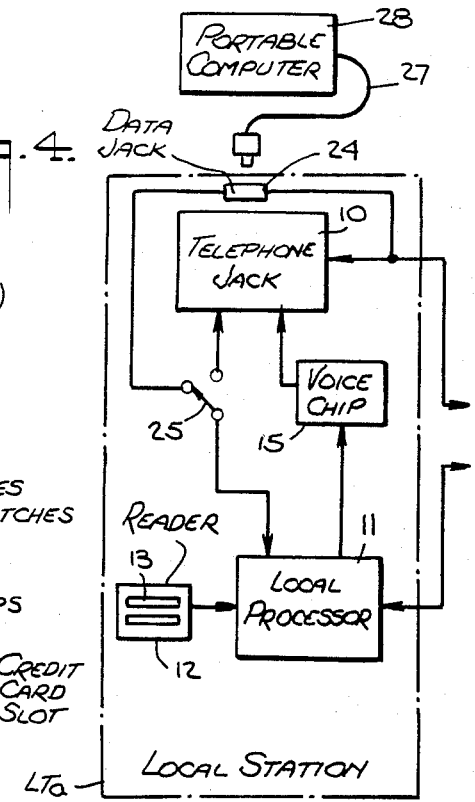
FIG. 4 shows a modified form of local station to render it suitable for data transmission.

The arrangement shown in FIG. 4 makes it possible in a public access credit-card activated network of the type shown in FIG. 2 to also transmit computer data, the card holder who uses this network for data transmission being billed therefor by the company issuing the credit card.

Since the only modification of the network necessary to accomplish this purpose is at the local station, in FIG. 4 only this station is shown, the system otherwise being the same as in FIG. 2. Shunted across telephone set 10 is a standard telephone jack 24. A single pole double-throw mode switch 25 is provided to connect local processor 11 either to telephone set 10 for operation of the network in the telephone mode or to jack 24 for operation in the computer mode. Jack 24 is adapted to receive a standard modular plug 26 coupled by an extension cable 27 to a portable computer or data transmission device 28.

In practice, jack 24 may be installed on the face of the telephone unit in the local station booth. To link the portable computer 28 plugged into the jack to the main frame computer at the home office or to any data base available by telephone, the user first sets mode switch 25 to the telephone mode and then inserts his credit card in card reader 12. To prevent tampering, the jack may be provided with an electromagnetically-activated gate or shutter that is opened automatically only when the user's credit card is verified by the network.

When the credit card is verified, a dial tone is heard and the user then dials the number of the main frame computer. After he hears the signal indicating that he is connected to the main frame computer, the user then sets mode switch 25 to the computer mode and the computer proceeds to transmit data, during which period the telephone set is inactive.

The Tandy portable computer is provided with a computer telephone directory so that the user can look up a phone number in the directory and use his computer to dial the call automatically. In this instance, after the dial tone is heard, the user does not then dial in the number of the main frame computer, but switches immediately over to the computer mode to allow the computer to carry out dialing.

In either case, the local processor acts to time the duration of the data transmission and to create the necessary billing record in the manner previously described in connection with telephone calls. However, the local processor flags data transmission by an appropriate code to distinguish this from voice transmission. Charges for the data call as well as for the rental of any data terminal equipment provided at the local station will appear as a single entry on the monthly billing statement of the credit card used.

Where there has been shown and described a preferred embodiment of a card-actuated telecommunication network in accordance with the invention, it will be appreciated, however, that many changes and modifications may be made therein without departing from the essential spirit thereof.

Thus while the system disclosed herein is arranged to activate the telephone set at the local station only after the credit card is validated, in practice, the call may go through immediately after dialing without waiting for the verification process to be completed, the call thereafter being terminated should the card be found to be invalid.

Also, while in the telephone set disclosed herein, no coin receiver is provided but only a credit-card slot, in practice one may include a coin receiver and give the user the option of making a credit-card or a coin-paid call. Thus a user intending to make a local call at the local station, need not use his card for this purpose.

Also, in some instances, the links between the local stations and the satellite may be local loops equipped with an automatic dialing device to call into the satellite, thereby effecting a link equivalent to the previously-mentioned dedicated link.

We claim:

1. A public access network operating in conjunction with existing telecommunication lines, making it possible for a caller holding a credit card issued by any one of several companies to dial calls from any local station included in the network, said network comprising:
   A. a satellite acting as a hub to connect local stations assocated therewith to said telecommunication lines;
   B. a plurality of local stations accessible to the public and associated with said satellite, each station being provided with a normally-inactive communication set linked to said satellite whereby when said set is activated, a call dialed therefrom goes through a line selected from said telecommunication lines to the called destination, and a credit card reader adapted to receive a caller's credit card to generate a digital signal representing the card and its holder;
   C. means responsive to said signal to determine its acceptability to the network, thereby limiting access to the network to valid cards; and
   D. means to generate data regarding the location of the local station from which each call originates as well as the destination of the call and its duration and to relate this data to data derived from the digital signal in regard to the identity of the credit card used by each caller to provide billing information to be supplied to the several companies, making it possible for each of these companies to bill its card holders for calls made through the network.

2. A public access network operating in conjunction with existing telecommunication lines, making it possible for a caller holding a credit card issued by any one of several companies to dial calls from any local station included in the network, said network comprising:
   A. a group of satellites installed at different locations, each including an intelligent digital switch coupled to said telecommunication lines to select a line appropriate to the destination of a call dialed from an originating local station;
   B. a plurality of local stations accessible to the public and associated with a respective satellite in said group, each local station being provided with a normally-inactive communication set linked to the intelligent switch of said satellite whereby when said set is activated, a call dialed therefrom goes through the line selected by the switch to the called destination, and a credit card reader adapted to receive a caller's credit card to generate a digital signal representing the card and its holder; and
   C. a master control central linked to all of said satellites to supervise the operation thereof, said central including means responsive to a digital signal transferred thereto from an originating local station through the satellite associated therewith to determine whether the card from which the digital signal is derived is acceptable to the network, and to send back to said original local station an acceptance signal to activate the communication set.

3. A network as set forth in claim 2, wherein each local station includes a local processor coupled to said card reader to transfer said digital signal from the reader to the associated satellite, said local processor being coupled to said communication set to activate said set when said acceptance signal is received from the control central.

4. A network as set forth in claim 3, wherein said satellite includes a multiplexing unit connected to the local processors in the plurality of local stations associated with said satellite to transfer the digital signal at the originating local station to the control central.

5. A network as set forth in claim 4, wherein said control central includes a verification processor connected to the multiplexing unit and responsive to the digital signal transferred thereto to determine whether the related card is acceptable, said processor having access to a table of unacceptable cards, or to a list of all acceptable cards.

6. A network as set forth in claim 5, wherein said central further includes a billing processor coupled to said verification processor to provide billing information from the card data and call data yielded by the verification processor.

7. A network as set forth in claim 6, including message means at said communication set to indicate to the caller that the card is or is not acceptable.

* * * * *